Jan. 24, 1928.
M. B. HAMMOND
1,657,357
BUMPER FOR AUTOMOBILES
Filed Sept. 19, 1927
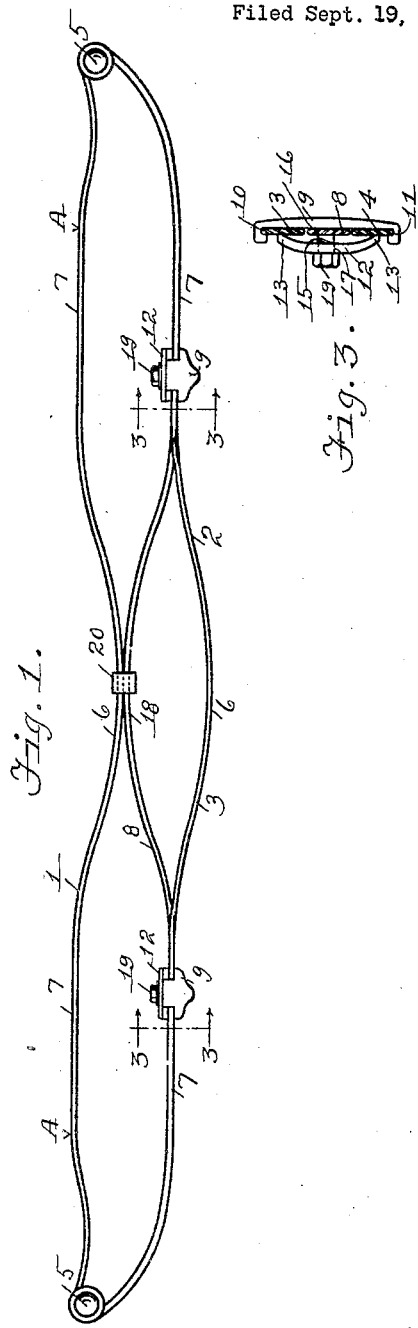
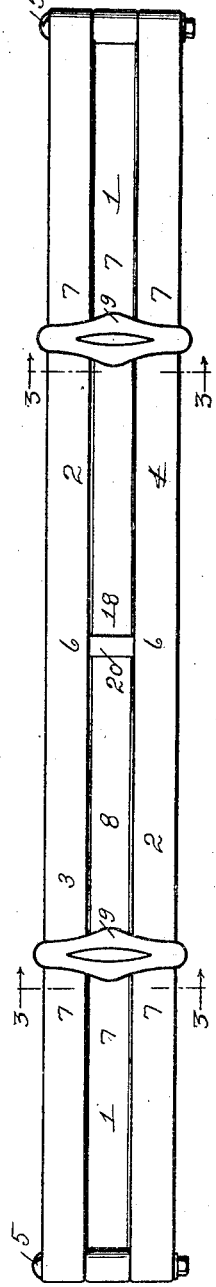
INVENTOR
Milton B. Hammond
BY
Cyrus W. Rice
ATTORNEY Patented Jan. 24, 1928.

1,657,357

UNITED STATES PATENT OFFICE.

MILTON B. HAMMOND, OF GRAND RAPIDS, MICHIGAN, ASSIGNOR TO WOLVERINE BUMPER & SPECIALTY COMPANY, OF GRAND RAPIDS, MICHIGAN, A CORPORATION OF MICHIGAN.

BUMPER FOR AUTOMOBILES.

Application filed September 19, 1927. Serial No. 220,439.

The present invention relates to bumpers for automobiles and the like; and its object is to provide such a bumper which shall prove in practice to be strong and nevertheless sufficiently resilient to protect the vehicle on which it is mounted from injurious impacts; and further, to provide improved means for connecting the members of such a bumper.

This object is attained by, and the invention finds preferable embodiment in, the bumper structure hereinafter particularly described in the body of this specification and illustrated by the accompanying drawings, in which:

Figure 1 is a top plan view of a bumper for vehicles;

Figure 2 is a front view thereof; and

Figure 3 is a transverse sectional view of the same taken on either line 3—3 of Figures 1 and 2.

In the embodiment of the invention illustrated by the drawings, a bumper for vehicles is shown having main resilient bars horizontally and parallelly disposed, i. e., the rear bar 1 which is mounted on the vehicle by suitable means or supports engaging said rear bar adjacent the points A, A, and the front bar designated generally 2 and comprising vertically spaced parallelly disposed members 3, 4. The rear bar 1 is connected at its ends, preferably pivotally at 5, 5, about vertical axes, to and between the ends of the members 3, 4 of the front bar. Both these bars, 1, 2 (including the members 3, 4 of bar 2) have forwardly bowed middle portions 6 and relatively straight end portions 7, 7. The bumper has also an intermediate resilient bar 8 connected at its ends to said end portions of the front bar adjacent its said middle portion, being thus connected between its members 3, 4, and preferably by the following means:

A front member or plate 9 engages the forward or front side of the intermediate bar and of the two members 3, 4 of the front bar, said plate 9 having upper and lower recesses 10, 11 receiving the upper edge of the uppermost member 3 of the front bar and the lower edge of the lowermost member 4 of said front bar respectively. Cooperating with said plate 9 is a rearwardly bowed member 12 engaging at its ends 13, 13 the rear sides of said uppermost and lowermost members 3, 4 respectively of the front bar. Threaded means—the bolt 15—extends rearwardly from the front member 9 and through openings indicated at 16 and 17 in the intermediate bar 8 and the rear member 12 respectively, and is provided with a head or nut 19 thus holding said members 9 and 12 in clamping contact with the members 3, 4 of the front bar.

The intermediate bar 8 is bowed rearwardly at 18 and is connected, preferably rigidly, at its middle to the middle of the rear bar, by suitable means as the collar or clamp 20.

It will be seen, particularly by reference to Figure 1, that the forwardly bowed middle portions 6, 6 of the front and rear bars especially in combination with the rearwardly bowed intermediate bar, (these bars being connected) provides a peculiarly strong and nevertheless sufficiently resilient bumper structure.

The invention being intended to be pointed out in the claims, is not to be limited to or by details of construction of the particular embodiment thereof illustrated by the drawings or hereinbefore described.

I claim:

1. In a bumper for vehicles: parallelly disposed front and rear resilient bars connected at their ends, each having a forwardly bowed middle portion and relatively straight end portions; an intermediate resilient bar connected at its ends to the end portions of the front bar adjacent its middle portion and being bowed rearwardly and connected at its middle to the middle of the rear bar.

2. In a bumper for vehicles: parallelly disposed front and rear resilient bars, each having a forwardly bowed middle portion and relatively straight end portions, the front bar comprising vertically spaced parallelly disposed members and the rear bar being connected pivotally about vertical axes to and between the ends of the members of the front bar; an intermediate resilient bar connected at its ends to the end portions of the front bar adjacent its middle portion and between its members, the intermediate bar being bowed rearwardly and connected at its middle to the middle of the rear bar.

3. In a structure of the character described having three vertically spaced resilient bars, means for connecting the same comprising: a member engaging the forward sides of the bars and having upper and lower recesses receiving the upper edge of the uppermost bar and the lower edge of the lowermost bar respectively; a rearwardly bowed member engaging at its ends the rear sides of the uppermost and lowermost bars respectively; threaded means extending between said members and through the middle bar.

In testimony whereof I have hereunto set my hand at Grand Rapids, Michigan, this 15th day of September, 1927.

MILTON B. HAMMOND.